United States Patent Office 3,084,251
Patented Apr. 2, 1963

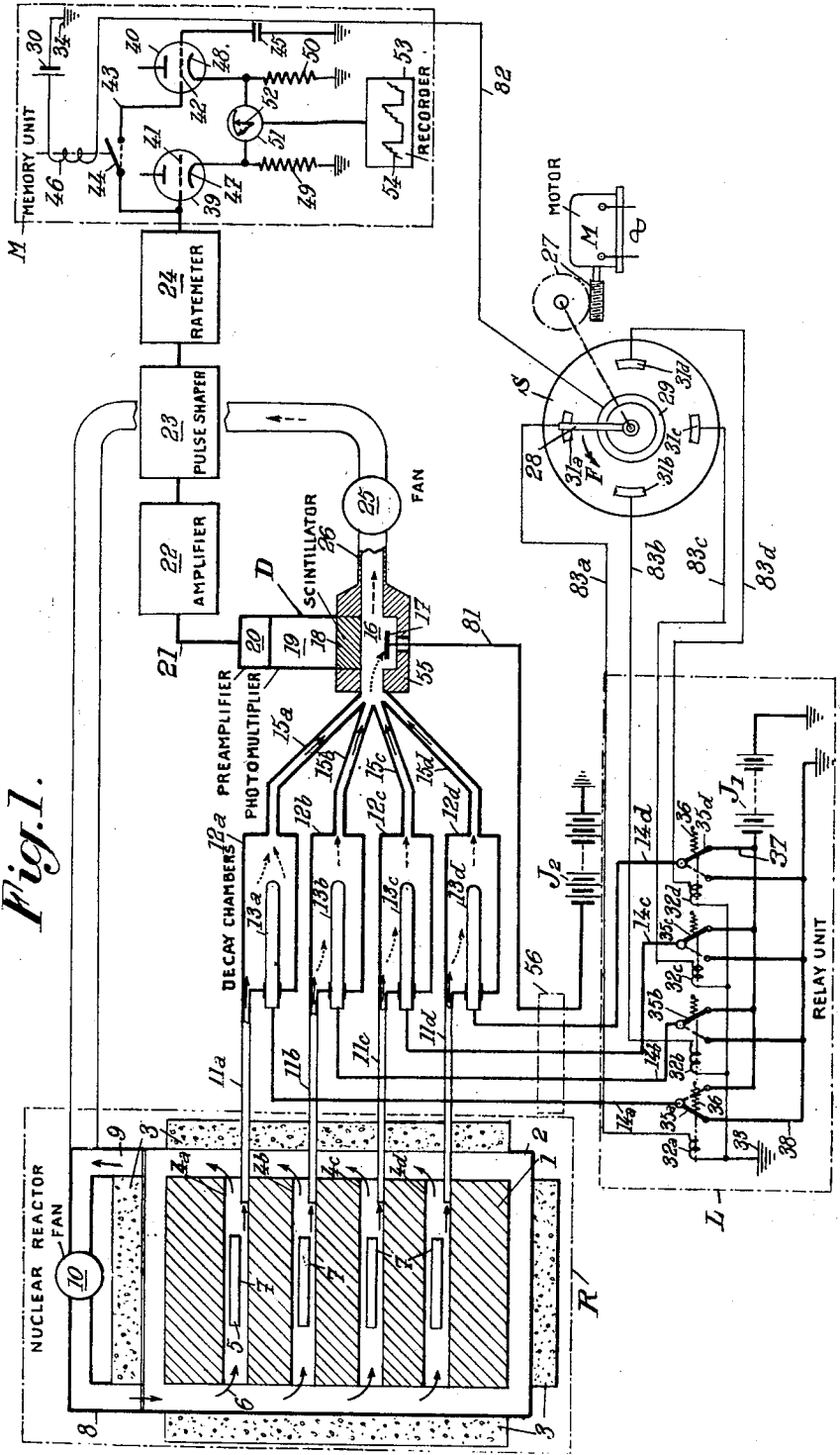

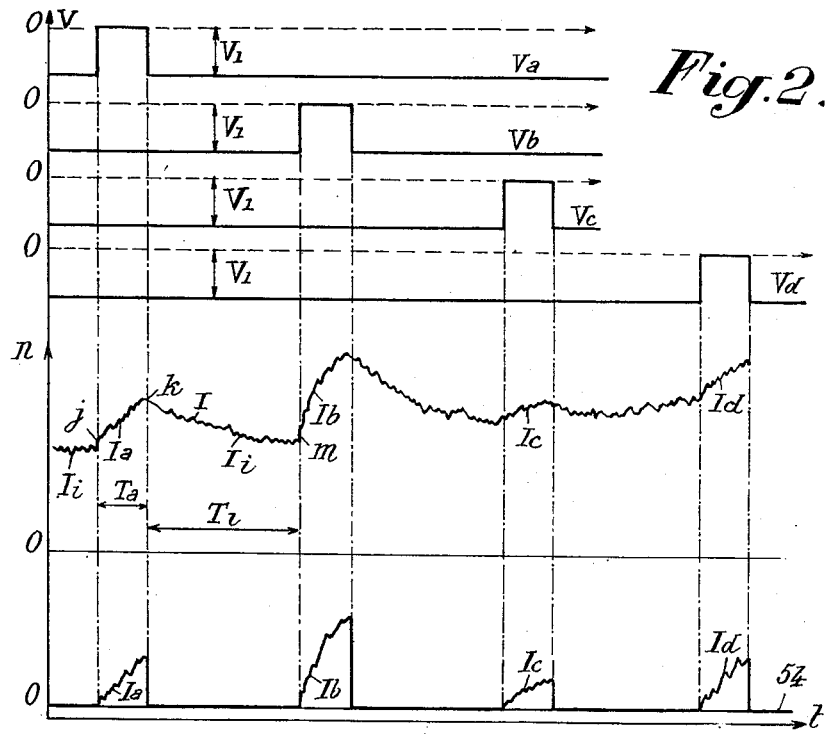
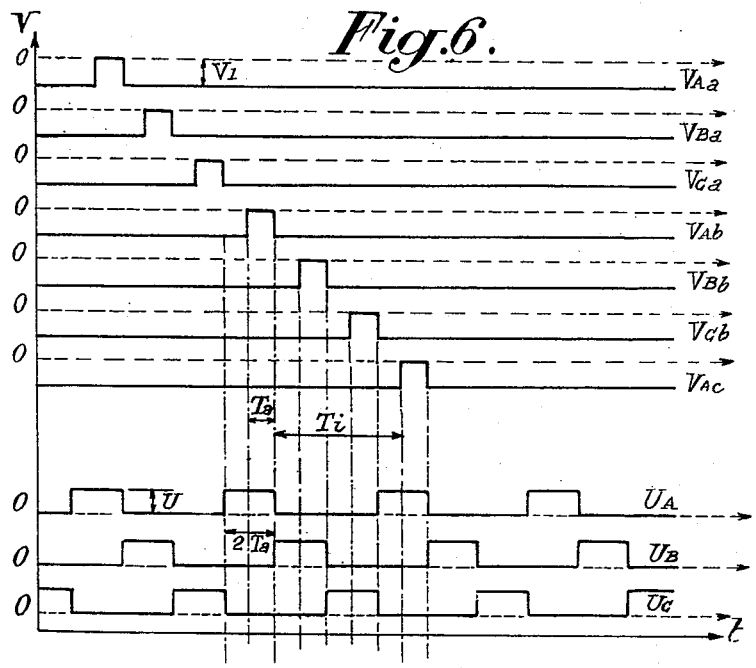

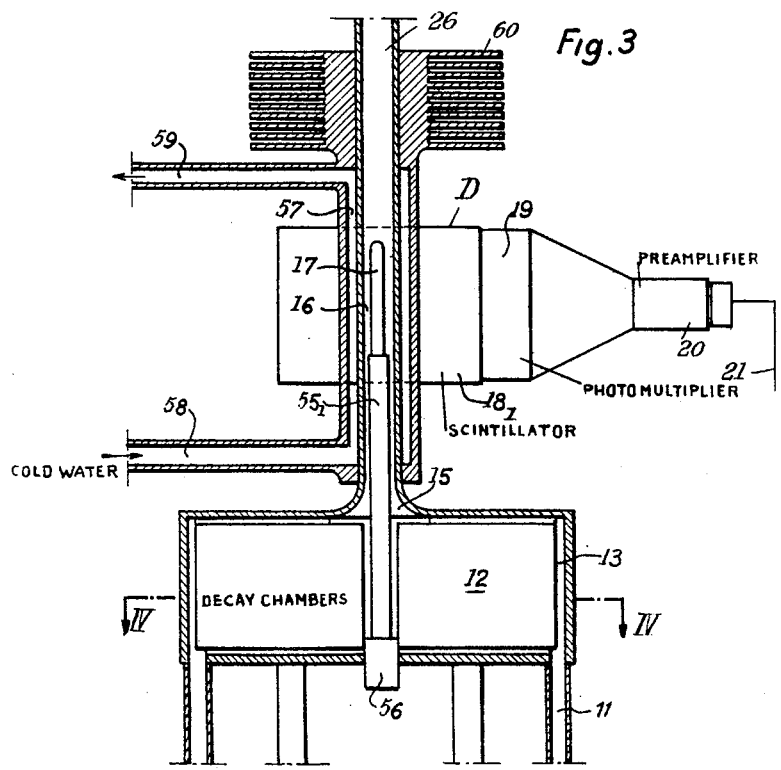
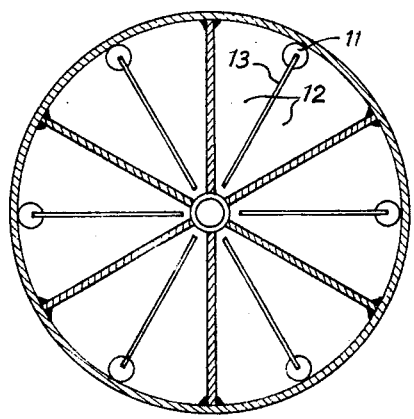

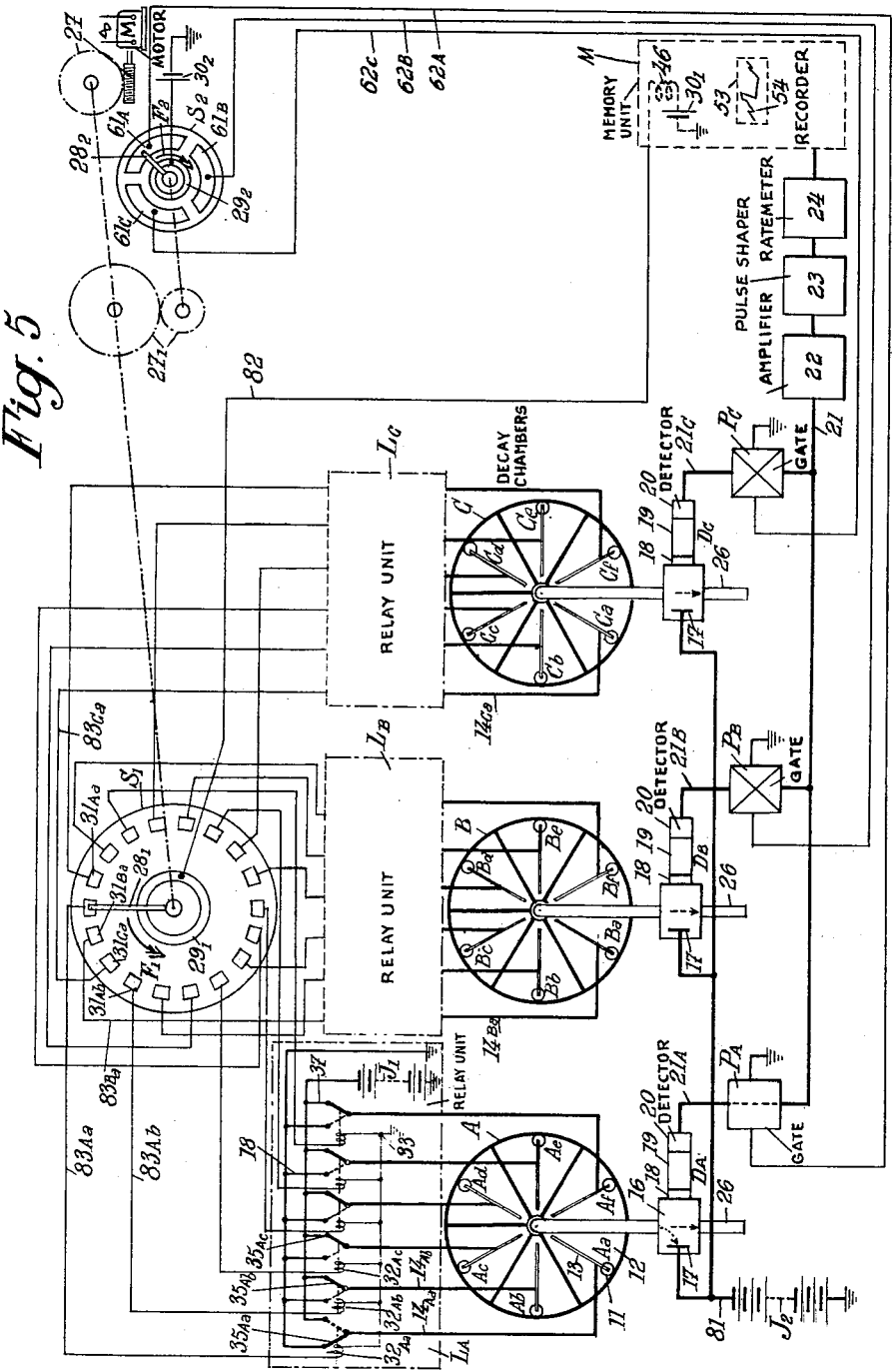

3,084,251
DETECTION OF BURST JACKETS IN NUCLEAR REACTORS COOLED BY A PLURALITY OF GASEOUS STREAMS
Jean Goupil, Fontenay-aux-Roses, France, assignor to Commissariat a l'Energie Atomique, Paris, France, an organization of France
Filed Apr. 20, 1959, Ser. No. 807,458
Claims priority, application France Apr. 26, 1958
14 Claims. (Cl. 250—83.3)

The present invention relates generally to the monitoring of nuclear reactors cooled by a plurality of gaseous streams and more particularly to the detection of leaks, or other failures, in the jackets or cans surrounding the slugs or cartridges of nuclear fuel (including a fissionable and/or fertile matter) in such reactors.

The invention is particularly useful for monitoring heterogeneous reactors, wherein elements or slugs in a fissile or fissionable matter (as uranium or a uranium compound or alloy, eventually enriched in the $U_{235}$ isotope) are positioned in a plurality of channels (often more than thousand channels) disposed in a block of solid moderator (as graphite), the heat released by the chain fission reaction of the fissionable material being carried away by a plurality of gaseous streams sweeping said channels in heat-exchange relationship with said elements of fissionable material. But the invention concerns also, more generally, any type of nuclear reactor cooled by a plurality of gaseous streams.

It is well known that the burst of the fluid-tight jacket surrounding a fissionable fuel element in a nuclear reactor has very serious consequences and must, therefore, be detected very promptly; in fact, such a jacket has for an object to prevent, on the one hand, the fissionable element surrounded thereby to be attacked by the gaseous stream in heat-exchange relationship therewith and, on the other hand, the highly radioactive fission products (which are released by the chain fission reaction in the fissionable material of the fuel element) to reach said gaseous stream.

It was proposed in French Patent No. 1,127,618 filed June 9, 1955, by Commissariat a l'Energie Atomique to detect the bursts of jacketed slugs in gas-cooled nuclear reactors by measuring the radioactivity of the fission products ejected through the bursts of the jackets in the cooling gas, this measure being realized by one or several nuclear radiation detectors or counters, as scintillation counters, disposed along the passage of gaseous samples picked-up from the cooling gas circuit of the reactor.

When the monitored nuclear reactor includes many channels, it is advantageous, for economy reasons, to monitor with a single radiation detector, as suggested in the above-mentioned French Patent, a group of several channels, said detector receiving successively gaseous samples from each channel in said group; preferably, other radiation detectors, followed by recorders, monitor continously the radioactivity of the effluents from the channels which have previously exhibited an alarmingly high radioactivity.

The necessary switching for monitoring, with a single radiation detector, the effluents from several channels have been realized, until now, by means of valves directing successively and cyclically on said single detector gaseous samples picked up from the gaseous streams leaving each channel monitored by said detector; these valves are controlled either mechanically or preferably electrically (electro-valves); but the known electro-valves have unfortunately a certain number of drawbacks, the main drawbacks being the following ones: their price is high; their fluid-tightness is quite a problem; the mobile elements of the valves are generally delicate; the high power required for their control demands important relays; they resist poorly to the temperatures to which they are brought during their functioning in the burst slug detection devices.

The present invention has therefore for an object to eliminate the previous drawbacks of the burst slug detection devices comprising the switching of several gaseous streams on a same radiation detector, by realizing a purely static switching, i.e. without any mobile element in the gas flow.

The invention takes advantage of the fact that, among the fission products and their daughters, exist solid ions, as rubidium and cesium ions which are the decay products of the gaseous kryptons and xenons.

A device, according to the invention, for detecting leaks in the jackets surrounding the slugs of fuel elements in a nuclear reactor, cooled by at least one plurality of gaseous streams circulating through said reactor in heat-exchange relationship with said elements, comprises, for each of said pluralities: a detecting unit comprising: a collecting conduit; a single nuclear radiation detector associated to said conduit; for each of said gaseous streams of said plurality, a picking-up tube for picking up permanently a sample of said gaseous stream; a decay chamber connected to said picking-up tube, an electrode disposed in said chamber and normally polarized to collect the radioactive ions present in said chamber, and a channel for connecting said chamber to said collecting conduit; and means for successively and cyclically grounding each one of said electrodes.

Due to this structure of the detecting unit, comprising an electrostatic switching zone for the various gaseous streams and a common measuring zone, the single radiation detector receives, successively and cyclically, from the various picking-up tubes, radioactive ions, daughters of the fission products eventually picked up by each picking-up tube—i.e. the ions leaving the decay chamber with a grounded electrode (which therefore does not collect the radioactive ions)—and therefore delivers a signal which is a function of the fission product content of each gaseous stream of said plurality.

But the radioactivity, at a given moment, of any gaseous stream leaving the channel of a nuclear reactor is mainly constituted by the sum of the radioactivities of:

(a) The radioactive isotopes formed in said gas from the non-radioactive constituents thereof under the influence of the neutron flux existing in the nuclear reactor (for example argon 41 and nitrogen 16 result from the neutronic bombardment or argon 40 and nitrogen 15 of the air, respectively, e.g. when the cooling gas is air) and (b) The fission products (which reached the cooling gas through a burst in a jacket) which comprise on the one hand, the long-lived fission products, which, when the cooling gas is recycled through a nuclear reactor, have a radioactivity appearing in the cooling gas a long time after their ejection in said gas; on the other hand, the short-lived fission products having a radioactivity limited to a very short period subsequent to their ejection in the cooling gas, even if said gas is recycled, due precisely to their short half-life.

It is easily understood that the afore-mentioned long-lived fission products, as well as the radioactive isotopes, falsify the radioactivity measures intended to detect burst slugs and that the sole radioactivity which has to be detected and measured—if the passage of fission products in the cooling gas (and also if an increase of the quantity of said fission products in said gas) has to be detected immediately, in order to detect promptly a burst jacket (and to follow the evolution of the burst of said jacket in course of time)—is the radioactivity of the short-lived fission products.

Therefore, in the preferred embodiment of the invention, the measure of the radioactivity concerns mainly the radioactive ions, as the rubidium and cesium ions, daughters of the gaseous kryptons and xenons, having a half-life of a few seconds. Accordingly, the ions arriving through the common collecting conduit, after having passed through the above-mentioned electrostatic switching unit with decay chambers, are collected in said conduit by a collecting element, as an electrode maintained at a negative high potential. These ions loose their charge, whereas new ribidium and cesium ions continue to be collected. The ion concentration on the collecting electrode increases and would reach, for a very long collecting period, a limit for which the ion collecting is is counter-balanced by the decay or de-activation of the collected ions. The ion concentration reached on said negatively biased or polarized electrode after a determined period is then proportional to the actual ejection of of fission products in the monitored cooling stream and is therefore representative of the evolution of a brust in a jacket; in fact, said concentration is measured by the single radiation detector, as a scintillation counter.

In order to discard the previous radioactivity of the collecting element and of the gas surrounding said element, there is provided, according to a further feature of the invention, an electronic memory device performing a differential measure between the beginning and the end of the ion collection from the effluents of each decay chamber, thereby eliminating the continuous radioactivity component, corresponding to the normal radioactivity of the gas leaving said decay chamber and circulating in the collecting conduit.

Due to this design of the measuring zone or unit, with an ion collecting element (as an electrode) and to the discarding of the continuous component, the measured activity is essentially the activity of the particles which are precipitated by the switching electrodes when they are polarized. The collecting or precipitation process of both types of electrodes, i.e. the switching and the collecting electrodes, is in fact the same.

Of course, it is possible to provide, in the measuring unit, other means for realizing such a selectivity towards the short-lived fission products (only such a selectivity allowing to detect rapidly a burst in the sheath of a fuel slug and to follow the evolution of said brust) and hereunder, at the end of the detailed description of the invention, several examples of such means will be given.

The aforesaid and other objects, features and advantages of the invention will be more easily and fully understood from the illustration of several embodiments of a burst jacket detection device according to the invention, being understood that the invention is not restricted to the details of the illustrated and described embodiments, but that it is susceptible to modifications and adaptations.

In the attached drawings:

FIG. 1 shows schematically a device according to the invention.

FIG. 2 illustrates the curves giving the variation, in course of time, of the various electrical magnitudes involved in the device according to FIG. 1.

FIG. 3 shows a preferred embodiment of the switching and measuring units of the device according to FIG. 1.

FIG. 4 is a section along IV—IV of FIG. 3.

FIG. 5 shows schematically a device according to the the invention comprising several units of the type shown in FIGS. 3 and 4.

FIG. 6 illustrates the curves giving the variation, in course of time, of the various switching electrical magnitudes used in the functioning of the device of FIG. 5.

Figure 7:
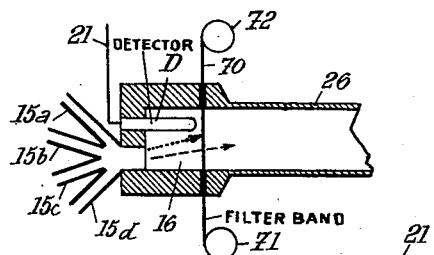
FIGS. 7, 8 and 9 show three modifications of the measuring unit, in a device according to FIGS. 1 or 5.

On FIG. 1 was shown a nuclear reactor R, of the type comprising a moderator block 1 (e.g. in graphite) surrounded, in the known manner, by a thermal shield 2 (e.g. in steel) and a biological shield 3 (e.g. in heavy concrete). The moderator block 1 is traversed by a plurality of parallel channels, for example of horizontal channels, only four of which were shown, i.e. the channels 4a, 4b, 4c, 4d, whereas in fact a nuclear reactor with solid moderator may comprise more than a thousand channels. In each channel are inserted one or several elements or slugs 5 of fissionable fuel material (for example uranium or an uranium compound, or alloy, eventually enriched in the $U_{235}$ isotope), isolated from the gaseous streams 6, circulating through the channels 4 in order to carry away the heat generated by the nuclear fissions in slugs 5, by a fluid-tight jacket, constituted by a sheath 7 (for example in magnesium, aluminum, a magnesium-aluminum alloy or stainless steel). The cooling gas (constituted for example, by air, carbon dioxide or helium, generally under pressure), which is in heat-exchange relationship with the jackets or sheaths 7, arrives by a duct 8 and, after having passed through all channels 4, leaves reactor R by a duct 9 from which it may be recycled by a fan 10.

A burst jacket in one of the channels 4 allows the radioactive fission products of the burst slug to reach the gaseous stream 6 which passes through said channel. For detecting such a burst slug, a device according to the invention comprises:

(a) A switching zone, which, for each gaseous stream 6, includes—a picking-up tube 11a, 11b, 11c, 11d, picking up permanently a representative sample from the effluents of the corresponding channel 4a, 4b, 4c, 4d; a decay chamber 12a, 12b, 12c, 12d wherein ends the corresponding picking-up tube and having a sufficient volume (about one to two cubic decimeters) so that during the transit time therein (for example of about 1 to 4 seconds) of the sample of said gaseous stream 6 picked up by tube 11, an appreciable fraction (for example of about 20 to 30%) of the short-lived xenons and kryptons (having a half-life of about a few seconds) decays with beta rays emission and production of the daughter radioactive rubidium+ and cesium+ ions, an electrode 13a, 13b, 13c, 13d located in the corresponding decay chamber and normally polarized or biased by a voltage source $J_1$, through a lead 14a, 14b, 14c, 14d, at a negative high potential $V_1$ (of about $-1,000$ to $-2,000$ volts according to the gaseous pressure in chambers 12, for example $-1500$ to $-2000$ volts for a pressure of 15 atmospheres) ensuring the collection or precipitation of substantially all radioactive ions (as the rubidium and cesium ions) present in chamber 12, i.e. produced in chamber 12 and upstream thereof; and a short connecting duct 15a, 15b, 15c, 15d for circulating the effluents of each chamber, i.e. the products which were not retained therein by electrode 13;

(b) A measuring zone comprising, for the plurality of the gaseous stream 6 which are monitored, a collecting conduit 16 located in the vicinity of a radiation detector D and comprising, just in front of said detector, a collecting electrode 17 brought, by a lead 81 connected to a current source $J_2$, to a negative potential $V_2$ of about $-1000$ to $-4000$ volts according to the pressure of the cooling gas (for example $-4000$ volts for a pressure of 15 atmospheres).

This detector D is advantageously constituted, as shown, by a scintillation counter selectively sensitive to the beta rays and comprising a scintillating substance or "phosphor" 18 (for example an organic substance as tetraphenyl-butadiene in polystyrene), and, for such a detector, it is advantageous to cool the gaseous samples picked up by tubes 11 by cooling means (not shown); to said scintillating substance is associated, in the known manner, a photomultiplier 19 and a preamplifier 20, the output of detector D being applied by a lead 21 to an amplifier 22, a pulse shaper 23 and a ratemeter 24, which delivers a signal representative of the number of scintillations produced in the substance 18 by the radioactive products in the collecting conduit 16, particularly by the radioactive products collected on electrode 17.

The channel constituted by detector D and electronic units 22, 23 and 24 is well known in the art of radiation detection and no further description of said elements is therefore deemed necessary; anyhow such detector and electronic units are fully disclosed in one or several of the following publications: J. Sharpe: Nuclear radiation detectors (2nd ed. 1957; Methuen & Co. Ltd., London); D. Taylor: The measurement of radio isotopes (2nd ed. 1957; Methuen & Co. Ltd., London); J. Cork: Radioactivity and Nuclear Physics, chapter 3 (3rd ed. 1957; Van Nostrand Co. Inc., Princeton, New Jersey); Report on "Scintillation Counting 1956," pp. 33 to 64 in the monthly review "Nucleonics" of April 1956 (a McGraw-Hill publication).

After detection, the gaseous samples picked up by tubes 11 are recycled, by means of a fan 25 and a duct 26, in duct 9.

In order to realize a purely static switching between the various picking-up tubes 11a, 11b, 11c, 11d, means are provided for successively and cyclically interrupting the polarization, i.e. the feeding, of each electrode 13a, 13b, 13c, 13d.

In the embodiment shown in FIG. 1, these means include essentially a rotating switch S, driven by an alternating motor M, and a relay unit L. More precisely, motor M drives at a constant speed, through reduction gear 27 (comprising for example an endless screw and a toothed wheel), a metallic arm 28 which cooperates with a circular conducting zone 29, fed by one of the terminals of a current source 30 by a lead 82, and with four contact studs 31a, 31b, 31c, 31d, connected each one through a lead 83a, 83b, 83c, 83d to one of the terminals of the winding of a relay 32a, 32b, 32c, 32d respectively, the other terminal of said relay winding being grounded in 33, whereas the other terminal of source 30 is grounded in 34.

Each one of the windings 32 controls an armature 35a, 35b, 35c and 35d which, in the rest or off position of the corresponding relay, is biased by a spring 36 so as to connect (as shown for armatures 35b, 35c, 35d) a lead 14 to a lead 37 connected to one of the terminals of source $J_1$, the other terminal of said source being grounded, but which, for the active or on position of said relay connects (as shown for armature 35a) a lead 14 to a lead 38 directly connected to the ground.

At last, in order to determine only the radioactivity corresponding to the short-lived fission products, the exit of ratemeter 24, which is proportional to the radioactivity measured by detector D, is applied to a memory device M comprising two triodes 39 and 40 having the grids 41 and 42 thereof connected through a lead 43 and the armature 44 of a relay when said relay is in its rest or off position; further, grid 41 is connected to the output of ratemeter 24, whereas grid 42 is connected to one of the armatures of an electricity-storing element or capacitor 45 having the other armature thereof grounded. Cathodes 47 and 48 of triodes 39 and 40 are, on the one hand, grounded through resistors 49, 50 and, on the other hand, connected to both inputs of a differential voltmeter 51, the needle 52 of said voltmeter assuming therefore a position which is a function of the difference between the voltages applied on grids 41 and 42.

On FIG. 1, and also on FIG. 5 described later on, ordinary arrows in solid lines were used for showing the circulation of the cooling gas, arrows in dotted lines for the circulation of solid ions, arrows in dashed lines for the circulation of gaseous samples, the solid ions being excepted, and double headed arrows were used for showing the rotation direction of the arms of the rotating switches.

The functioning of the device illustrated in FIG. 1 is the following, reference being also made to the curves of FIG. 2. Motor M drives in rotation, at constant speed, arm 28 of switch S in the direction of arrow F and therefore successively feeds the windings 32a, 32b, 32c and 32d, thereby successively grounding the electrodes 13a, 13b, 13c and 13d. In the shown position of arm 28, the armatures 35 occupy the position shown in full lines and therefore electrode 13a is grounded, whereas electrodes 13b, 13c and 13d are polarized, at the high negative potential $V_1$. Under these conditions: the gases, permanently picked up by tubes 11, pass freely through chambers 12, ducts 15, collecting conduit 6 and are recycled by duct 26; the solid ions, and especially the rubidium and cesium ions, arriving through picking-up tubes 11b, 11c and 11d are attracted by the polarized electrodes 13b, 13c and 13d; on the contrary, the solid ions arriving through picking-up tube 11a pass freely through chamber 12a, as electrode 13a thereof is grounded, and reach by duct 15a the collecting conduit 16; in this collecting conduit, said ions are attracted by collecting electrode 17, permanently polarised at a high negative potential $V_2$.

Consequently, the radiation detector D, which essentially detects the activity of the ions collected on electrode 17, detects then the presence of radioactive ions resulting from the ejection of fission products in channel 4a and therefore an eventual burst slug in said channel. When arm 28 of switch S successively reaches contact studs 31b, 31c, 31d, detector D determines the eventual passage in conduit 16 of radioactive ions arriving successively from chambers 12b, 12c and 12d, and consequently the ejection of fission products in the gaseous stream 6 passing through channels 4b, 4c and 4d successively, and so on.

On FIG. 2, the voltages Va, Vb, Vc and Vd (applied to electrodes 13a, 13b, 13c and 13d respectively) are plotted against the time $t$; further curve I shows the output (in counts $n$ per minute) of ratemeter 24 in course of time $t$. Said curve I comprises active periods Ia, Ib, Ic and Id (having each a duration Ta e.g. of about 20 to 30 seconds and corresponding to the grounding of electrodes 13a, 13b, 13c, 13d respectively) during which are collected, by electrode 17, successively the ions arriving through the channels 15a, 15b, 15c, 15d, as the corresponding electrode 13a, 13b, 13c, 13d is grounded, i.e. at a zero potential. During the inactive periods Ii (having each a duration Ti at least equal to 1,5 Ta), electrode 17 is progressively de-activated as no further radioactive ions reach conduit 16 during these inactive periods.

It is easy to understand now the shape of curve I: the detected radioactivity increases, first quickly, then slowly, during an active period, as Ia, from $j$ to $k$, as the collection is progressively counterbalanced by the de-activation; during the next inactive period Ii, the detected radioactivity decreases from $k$ to $m$, the de-activation playing alone a part; detector D detects at the end of period Ii, in $m$, only the residual activity of the ions previously collected during the period Ia by electrode 17 and the activity of the gaseous products passing permanently through the collecting conduit 16. It should be considered that the voltage $V_2$ is greater than voltage $V_1$ (in absolute value) due to the fact that conduit 16 has a smaller volume than chambers 12 and that consequently the gas speed is higher in said conduit than in said chambers.

The unit M has for an object to increase the sensitivity of the measure by determining only the activity due to the ions collected by electrode 17 during each active period and eliminating the sum of residual activity of the ions previously collected and of the gaseous products activity (said sum corresponding to the value of the activity in points as $j$ or $m$). Therefore, during each active period, the relay winding 46 is fed through switch S, thereby breaking in 44 the connection between grids 41 and 42 through lead 43, whereas during each inactive period Ii the potential of electrodes 41 and 42 is the same. Consequently during an inactive period the differential voltmeter 51 indicates zero (position in dotted line of needle 52), because the potentials applied on both grids 41 and 42 are the same; but during an active period, the circuit being open in 44, grid 42 keeps its initial potential (for example at point $j$) due to the presence of electricity storing element or capacitor 45, whereas grid 41 is brought to the potential corresponding to the exit of ratemeter 24 which progressively increases during the active period I$a$ with the collection of radioactive ions on electrode 17, therefore first rapidly, then more slowly as the ion decay starts to counterbalance the collection; needle 52 of voltmeter 51 is solicited to the right (position in full lines of said needle). At the end of period I$a$, in $k$, the relay winding 46 is no more fed and therefore needle 52 returns to its zero position. Therefore on recorder 53 provides curves 54 (FIGS. 1 and 2), on which appear very clearly the active periods I$a$, I$b$, I$c$ and I$d$, the radioactivity determined by detector D during the inactive periods I$i$ (even in the absence of radioactive ions, and therefore of a burst slug) having been deducted from the total detected radioactivity I; thereby the sensibility as well as the signal to noise ratio are improved and consequently the selectivity of the device.

Also in order to improve the sensibility and the selectivity, it is advantageous: to reduce at a minimum the length of ducts 15 in order to prevent the formation therein of ions which would not be stopped by the switching electrodes 13; to reduce the volume of the collecting conduit 16 through which passes the normally activated gas which is capable of action on detector D and; to provide around detector D a shield 55 preventing the ambient radiations, e.g. the radiation coming from reactor R, to reach said counter and falsify the measures thereof.

On FIGS. 3 and 4 (on which the same reference numerals were utilized as on FIG. 1 for the similar elements) was shown a preferred embodiment of the switching and measuring zones of FIG. 1 allowing a particularly rugged construction. In this embodiment, the decay chambers 12 are constituted by sections or slices of a cylinder, divided in two by plate electrodes 13, each chamber 12 being fed in a gaseous sample picked up from the reactor channel (or group of channels) by a picking-up tube 11 ending peripherically in said chamber. Very short connecting ducts 15 end in a collecting conduit 16 in the middle portion of which is disposed electrode 17 which is surrounded, in the zone wherein it should not act by a grounded shield $55_1$ (corresponding to shield 55 to FIG. 1). The necessary connections for the electrodes 13 and 17 are gathered in a bunch 56 (also shown on FIG. 1) from which leave leads 14 and 81 (FIG. 1).

In the embodiment of FIGS. 3 and 4, the scintillating substance $18_1$ is thermically isolated from the gas circulating in the collecting conduit 16 by a water screen 57, cooling water arriving through duct 58 and leaving through duct 59; the cooling is improved by fins 60. In this case, the measure is selectively performed on the gamma rays, as screen 57 prevents more or less the passage of beta rays. It is then possible to utilize the same scintillating substance as in the above mentioned case, but preferably a thallium activated sodium iodide crystal.

When the nuclear reactor to be monitored comprises a very great number of channels, it is advantageous to divide these channels into pluralities comprising each one several channels, each plurality being monitored, as concerns the detection of leaks in the jackets surrounding the fuel slugs, by a unit of the type shown on FIGS. 3 and 4, the outputs of the detectors D of the various units being sent successively on a common electronic channel of the type shown on FIG. 1 (units 22, 23, 24 and M). Such an embodiment is shown on FIG. 5 for which it was supposed that eighteen channels (or groups of channels) of a nuclear reactor have to be monitored by means of three units according to the invention comprising each one a switching zone and a measuring zone. The reactor, which may be of the same type as reactor R of FIG. 1, was not shown on FIG. 5 in order to simplify said figure.

The eighteen picking-up tubes are divided in three pluralities each plurality of tubes ending in a static switch A, B, C comprising six decay chambers 12 and six electrodes 13. Each electrode 13 is normally polarized to a negative high potential $V_1$ (of the same value as indicated hereinabove) by a lead 14, a relay armature 35 and a lead 37 connected to the negative terminal of a source of potential $J_1$. Cyclically each armature 35 is moved from its off-position (shown for armature 35A$b$) to its on-position (shown for armature 35A$a$) wherein it grounds, through lead 38, the corresponding electrode 13 as the cooperating relay winding 32 is energized.

There are therefore three units $L_A$, $L_B$, $L_C$, similar to the unit L of FIG. 1 and controlled from a rotating switch $S_1$, similar to the rotating switch S of FIG. 1 but comprising eighteen contact studs 31A$a$, 31B$a$, 31C$a$, 31A$b$ . . . coresponding to the eighteen sections or chambers A$a$, B$a$, C$a$, A$b$ of the static switches A, B, C. The rotaing switch $S_1$ includes a rotating arm $28_1$ cooperating with contact studs 31, connected to relay windings 32 through leads 83, and with a circular conducting band 29, connected through lead 82 to a source of potential $30_1$ in a memory unit M similar to memory unit M shown in detail in FIG. 1; said arm $28_1$ is driven in rotation, at a constant speed, in the direction of arrow $F_1$, by an alternating motor M through a reduction gear 27; furthermore a couple of toothed wheels $27_1$ allows, from same motor M, the driving in rotation, in the direction of arrow $F_2$, of the mobile arm $28_2$ of a rotating switch $S_2$ including three contact zones $61_A$, $61_B$ and $61_C$ when there are three switches A, B, C. The multiplication ratio of wheels $27_1$ is such that arm $28_2$ performs six revolutions during a time period for which arm $28_1$ performs one revolution. The arm $28_2$ cooperates with contact zones 61 and with a circular conducting band $29_2$ fed by a source of potential $30_2$, so that switch $S_2$ successively sends through leads $62_A$, $62_B$, $62_C$ rectangular pulses which are gate triggering signals for normally non-conductive electronic gates $P_A$, $P_B$, $P_C$ provided between each exit lead $21_A$, $21_B$ and $21_C$ of detectors $D_A$, $D_B$, $D_C$ and the entry lead 21 of amplifier 22 followed by the same electronic channel 23, 24, M as amplifier 22 in FIG. 1.

The functioning of the device according to FIG. 5 is the following, reference being also made to curves of FIG. 6.

The motor M being excited, the switch $S_1$ (functioning as switch S of FIG. 1) sends signals $V_{Aa}$, $V_{Ba}$, $V_{Ca}$, $V_{Ab}$, $V_{Bb}$, $V_{Cb}$, $V_{Ac}$ . . . which, through relays 32–35, cyclically ground electrodes 13 of sections A$a$, B$a$, C$a$, A$b$, B$b$, C$b$, A$c$ . . . Therefore each of the collecting conduits 16 receives solid ions coming from one of the associated chambers 12 during an active period of duration T$a$, these ions being collected by electrode 17 thereof, which is permanently polarized at a high negative potential $V_A$ by means of source $J_2$ and lead 81; then, during an inactive period of duration $Ti=5Ta$ (during which the two other collecting conduits 16 receive solid ions), no ion arrives in said conduit 16, and the electrode 17 thereof is de-activated by decay of the previously collected ions. The switching between the output leads $21_A$, $21_B$, $21_C$ of the three detectors $D_A$, $D_B$, $D_C$ is realised by the successive gate triggering signals $U_A$, $U_B$, $U_C$, which successively render conductive electronic gates $P_A$, $P_B$, $P_C$ during the active periods of their associated electrode 17.

During a first period, corresponding to the position shown in FIG. 5 of arms $28_1$ and $28_2$, detector $D_A$ detects the ions produced by radioactive decay in chamber 12 of section A$a$ and the output signal of said detector arrives, through gate $P_A$ which is then conductive (i.e. transmits the received signals), to amplifier 22; the other gates $P_B$ and $P_C$ are non-conductive (i.e. do not transmit the received signals) as they receive no gate signal. During the following periods, the sections B$a$, C$a$, A$b$, B$b$, C$b$, A$c$ . . . are successively monitored due to the rotation of arms $28_1$ and $28_2$ synchronized by gear $27_1$.

It should be considered that the output of each channel of the nuclear reactor is analyzed during a period $Ta$, the gate corresponding to associated detector D being conductive during a period of about $2Ta$ comprising said period $Ta$. The electrode 17, associated to said detector, does not receive any more ions during a following period $Ti=5Ta$, so that said electrode is de-activated before the next arrival of radioactive ions from the following channel monitored by same detector D. The duration necessary for exploring the eighteen channels of the plurality monitored by detector D is $36Ta$, period which correspond to eighteen minutes if $Ta$ is equal to 30 seconds, such a 30 seconds duration being quite convenient for monitoring burst slugs in a nuclear reactor channel.

The output of ratemeter 24, which is successively and cyclically a function of the quantity of fission products ejected in the eighteen monitored channels, is sent in a memory device M (of the type shown in FIG. 1) so as to obtain a curve 54 which is determined only by the radioactivity corresponding to the short-lived fission products from said channels collected on collecting electrode 17.

Instead of realizing the ion collection or precipitation in the measuring zone by means of a collecting electrode 17 brought to a potential $V_2$ of about $-1000$ to $-4000$ volts, it is possible to use other collecting elements without departing from the spirit and scope of the present invention.

It is for example possible, as shown in FIG. 7 and as described in the above-mentioned French Patent No. 1,127,618 to collect the solid radioactive ions on a filter band 70 (which may be constituted by fibers having a diameter of about one micron) disposed between a delivery spool 71 and a receiving spool 72. The solid particles, as radioactive ions, are stopped by said filter band 70 (dotted arrows) and detected by detector D, whereas the gases pass through the filter band (arrows in dashed lines) and are recycled through duct 26. Band 70 is advanced step-by-step by means not shown, in synchronism with the switching of the grounding of electrodes 13, so as to provide the advancement of band 70 of a length substantially equal to the width of conduit 16 during each inactive period $Ii$.

Figure 8:
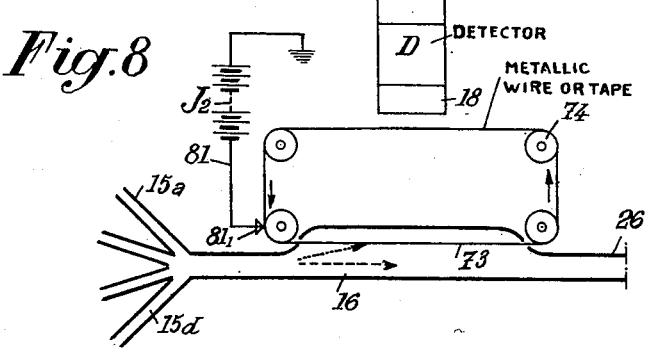

It is also possible, as shown in FIG. 8, to use a mobile collecting electrode 73 which allows to locate detector D at a certain distance from the cooling gas flow thereby reducing the background noise due to the radioactivity of said gas. The mobile electrode 73 may be constituted by a loop of metallic wire or ribbon driven e.g. step-by-step during each inactive period $Ii$ by rollers 74 and brought to a potential $V_2$ by a brush $81_1$ connected by a lead 81 to a potential source $J_2$. The wire or ribbon 73 collects the radioactive ions and brings them in front of the scintillating substance 18 of detector D, the radioactive gases passing through conduit 16 having on the contrary no influence on said detector (it should also be noticed that argon 41 decays in potassium 41 which is a non-radioactive element).

The embodiments of FIGS. 7 and 8 are advantageous when very many channels are monitored by a same detector D, because, when the activity varies very much from one channel to the other, to each channel is associated a special zone of the mobile filter band 70 or electrode 73, this zone presenting in front of the detector D only the collected ions which issued from said channel; the measure is therefore not falsified by the activity of the ions of the preceeding channels which were not yet completely de-activated.

Figure 9:
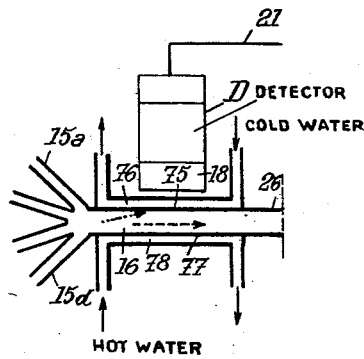

In another embodiment, shown in FIG. 9, it is possible to use, for realizing the collection or precipitation of the radioactive ions in the conduit 16 of the measuring zone, a metallic surface 75, which is for example cooled by circulating a cooling fluid 76 whereas the opposite surface 77 is heated by circulating a hot fluid 78, thereby realising in conduit 16 a temperature gradient and therefore a turbulent condition which promotes the impact of solid ions (arrows in dotted lines) on surface 75, in front of which is located the scintillating substance 18 of radiation detector D. It is of course possible to use means other than a temperature gradient for realising in conduit 16 a turbulent condition promoting the transversal motion of the radioactive ions and their collection or precipitation on a metallic surface as 75 in front of which is provided a radiation detector.

In the embodiments of FIGS. 7, 8 and 9, the exit lead 21 of detector D is connected for example as in the embodiments of FIGS. 1 and 5.

Although this invention has been described with reference to schematic embodiments thereof, it is to be distinctly understood that various modifications and adaptations of the arrangements herein disclosed may be made, as may readily occur to persons skilled in the art without constituting a departure from the spirit and scope of the invention as defined in the objects and in the appended claims.

For example, the selective detection of the short-lived fission products (relatively to the long-lived fission products and to the radioactive isotopes produced by neutronic bombardment in the cooling gas) may be performed with other means than the selective collection or precipitation in zone 16 and memory unit M, said other means using for example the difference in kind, energy, half-live and/or physical conditions of the short-lived fission products, on the one hand, and of the long-lived fission products and the radioactive isotopes of the cooling gas, on the other hand.

In a modification of the invention, other types of radiation detectors than scintillation detectors could be used. Also rotating switches S, $S_1$ and $S_2$ could be of another type and include for example a drum with cams, driven in rotation at a constant speed, said cams closing (or opening) electrical contacts during the rotation of the drum and thereby sending pulses, on the one hand, to the relays controlling the grounding of electrodes 13 and, on the other hand, to the electronic gates $P_A$, $P_B$ and $P_C$.

It is also, within the scope of the invention to pick up in one picking-up tube 11 a representative sample of the effluents of several channels (e.g. four channels) of a nuclear reactor in order to reduce the number of monitoring elements. In such a construction, the device according to the invention detects only the group of several channels (e.g. four channels) wherein occurred a burst in one of the protective jackets surrounding the fuel slugs present in said group of channels.

What I claim is:

1. Device for detecting leaks in the jackets surrounding the slugs of fuel elements in a nuclear reactor, cooled by at least one plurality of gaseous streams circulating through said reactor in heat-exchange relationship with said fuel elements, comprising, for each said plurality, a detecting unit including: a collecting conduit; a single nuclear radiation detector arranged to cooperate with said collecting conduit; for each gaseous stream of said plurality, a picking-up tube for picking up permanently a sample of said gaseous stream, a decay chamber connected to said picking-up tube, an electrode disposed in said chamber and normally negatively biased to collect the positive radioactive ions present in said chamber, and a channel for connecting said chamber to said collecting conduit; and means for successively and cyclically grounding each said electrode.

2. Device according to claim 1, wherein each said decay chamber has a volume comprised between about one and about two cubic decimeters.

3. Device according to claim 1, wherein the decay chambers of one unit are formed in a cylinder by radial separating panels, and wherein each said electrode is constituted by a radial plate dividing in two substantially equal sections the corresponding decay chamber.

4. Device according to claim 1, further including a metallic loop passing partially through said collecting conduit and in front of said radiation detector and means for advancing step-by-step said metallic loop in the time intervals separating the successive and cyclical operations of said grounding means.

5. Device for detecting leaks in the jackets surrounding the slugs of fuel elements in a nuclear reactor, cooled by at least one plurality of gaseous streams circulating through said reactor in heat-exchange relationship with said fuel elements, comprising, for each said plurality, a detecting unit including: a collecting conduit; an ion collecting element located in said collecting conduit; a single nuclear radiation detector located in front of said ion collecting element; for each gaseous stream of said plurality, a picking-up tube for picking up permanently a sample of said gaseous stream, a decay chamber connected to said picking-up tube, an electrode disposed in said chamber and normally negatively biased to collect the positive radioactive ions present in said chamber, and a channel for connecting said chamber to said collecting conduit; and means for successively and cyclically grounding each said electrode.

6. Device according to claim 5, wherein said ion collecting element is a permanently negatively biased electrode.

7. Device according to claim 5, wherein said ion collecting element is a filter band passing through said collecting conduit transversely thereto, and further comprising means for advancing step-by-step said filter band in the time intervals separating the successive and cyclical operations of said grounding means.

8. Device according to claim 5, wherein said ion collecting element is a cooled metallic surface.

9. Device for detecting leaks in the jackets surrounding the slugs of fuel elements in a nuclear reactor, cooled by at least one plurality of gaseous streams circulating through said reactor in heat-exchange relationship with said fuel elements, comprising, for each said plurality, a detecting unit including: a collecting conduit; a permanently negatively biased ion collecting electrode located in said collecting conduit; a single nuclear radiation detector located in front of said ion collecting electrode; means for visualizing the number of nuclear radiations detected by said detector; a hollow cylinder; radial partitions in said cylinder for dividing said cylinder in a number of decay chambers equal to the number of said gaseous streams in said plurality, each said decay chamber having a volume comprised between about one and about two cubic decimeters; a plate electrode disposed in each of said decay chambers and normally negatively biased to collect the positive radioactive ions present in said chambers; a series of picking-up tubes for picking up permanently a sample from each of said gaseous streams and connected each with one of said decay chambers; a series of channels for connecting each of said decay chambers to said collecting conduit; and means for successively and cyclically grounding each plate electrode.

10. Device according to claim 9, wherein said radiation detector is a scintillation detector selectively sensitive to beta rays.

11. Device according to claim 9, further including a cooling fluid screen between said collecting conduit and said radiation detector and wherein said radiation detector is a scintillation detector selectively sensitive to gamma rays.

12. Device according to claim 9, further including a memory unit determining the difference between the radioactivities measured by said detector at a given moment during the grounding period of each said electrode located in a decay chamber and at the beginning of said period, and a recorder recording the output of said memory unit.

13. Device for detecting leaks in the jackets surrounding the slugs of fuel elements in a nuclear reactor, cooled by at least two pluralities of gaseous streams circulating through said reactor in heat-exchange relationship with said fuel elements, comprising, for each one of said pluralities, a detecting unit including: a collecting conduit; a single nuclear radiation detector arranged to cooperate with said collecting conduit; for each gaseous stream of said plurality, a picking up tube for picking up permanently a sample of said gaseous stream, a decay chamber connected to said picking-up tube, an electrode disposed in said chamber and normally negatively biased to collect the positive radioactive ions present in said chamber, and a channel for connecting said chamber to said collecting conduit; and means for successively and cyclically grounding each said electrode; and, for said pluralities, common means for visualizing the number of nuclear radiations detected by any said detector; and means for successively and cyclically delivering in said common means the output of said radiation detector of each said detecting unit.

14. Device according to claim 13, wherein said means for successively and cyclically delivering in said common means comprise one electronic gate, disposed between each detector and said common means, and means for successively and cyclically applying on the electronic gates triggering pulses for rendering conductive said gates, the ratio between the duration of the electrode grounding cycle and the duration of the triggering pulses cycle being equal to the number of decay chambers in each detecting unit and the duration of each triggering pulse comprising the duration of a grounding period for a given electrode.

References Cited in the file of this patent

UNITED STATES PATENTS 2,751,505 Anderson _____ June 19, 1956
2,823,179 Snell et al. _____ Feb. 11, 1958

OTHER REFERENCES

A Continuous Monitor for Airborne Plutonium, by D. C. Collins, issued by E. I. du Pont de Nemours and Co., Explosives Dept., Atomic Energy Div., Technical Div., Savannah River Laboratory, November 1956, 16 pages.

Calder Hall Burst-Slug Detection, from Nucleonics, December 1956, pages 520, 521.